June 13, 1950     O. W. LEAF     2,511,353
HEATED MINNOW BUCKET

Filed Dec. 26, 1944     2 Sheets-Sheet 1

Inventor
OTTO WILLIAM LEAF

By Carlsen + Hazle
Attorneys

June 13, 1950   O. W. LEAF   2,511,353
HEATED MINNOW BUCKET
Filed Dec. 26, 1944   2 Sheets-Sheet 2
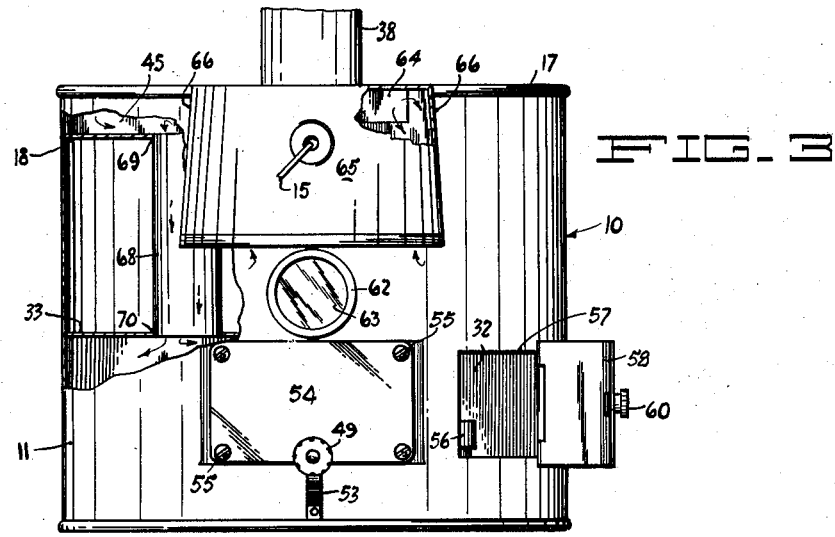
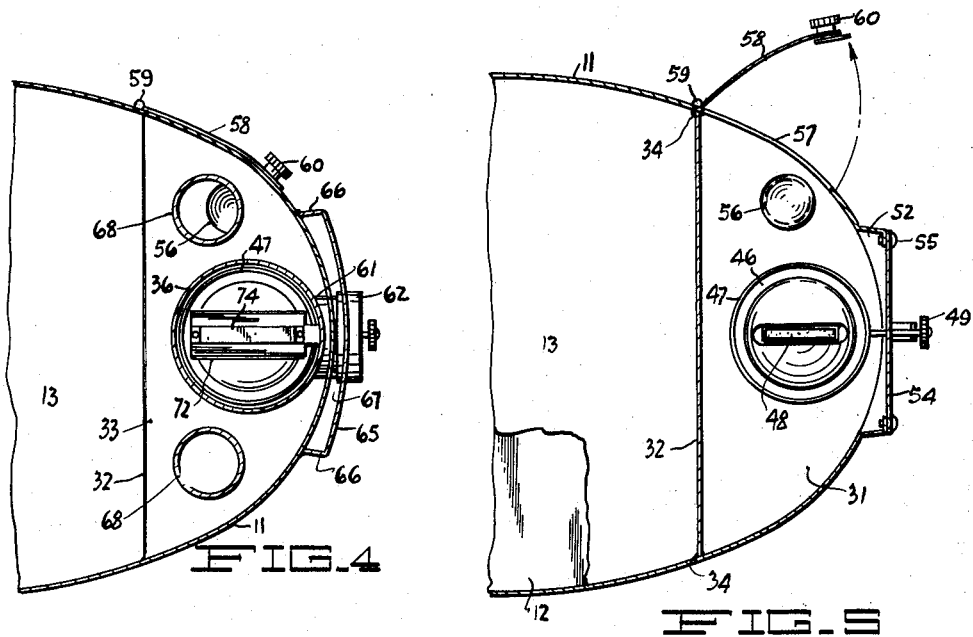
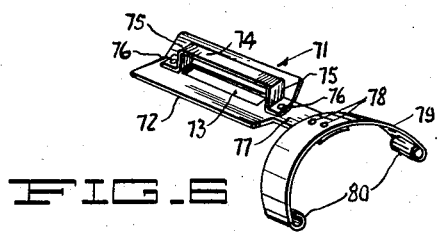
Inventor
OTTO WILLIAM LEAF
By Carlsen + Hagle
Attorneys Patented June 13, 1950

2,511,353

UNITED STATES PATENT OFFICE 2,511,353

HEATED MINNOW BUCKET

Otto W. Leaf, Minneapolis, Minn.

Application December 26, 1944, Serial No. 569,843

7 Claims. (Cl. 126—360)

This invention relates to improvements in minnow buckets for keeping and transporting the minnows used as bait in fishing.

The primary object of my invention is to provide a minnow bucket having a self contained heater mechanism by the use of which the water in the bucket may be warmed and kept from freezing while winter fishing through the ice. In this sport, frequently carried out when the temperature is far below freezing, great difficulty has been experienced in keeping minnows alive and lively as they should be for best results, but by the use of my bucket the bait may be readily kept in good shape even for days at a time. Another object is to provide a minnow bucket with self contained or built in heater which is convenient to use, is not adversely affected by wind, and which is quite simple in construction, compact in size, and light in weight.

These and other more detailed and specific objects will be disclosed in the course of the following specification, reference being had to the accompanying drawings, in which—

Fig. 3 is an end view, also with parts broken away to disclose interior details.

Fig. 4 is a fragmentary horizontal section along the line 4—4 in Fig. 2.

Fig. 5 is a similar view along the line 5—5 in Fig. 2.

Fig. 6 is an enlarged perspective detail view of the flame spreader alone.

Figure 1:
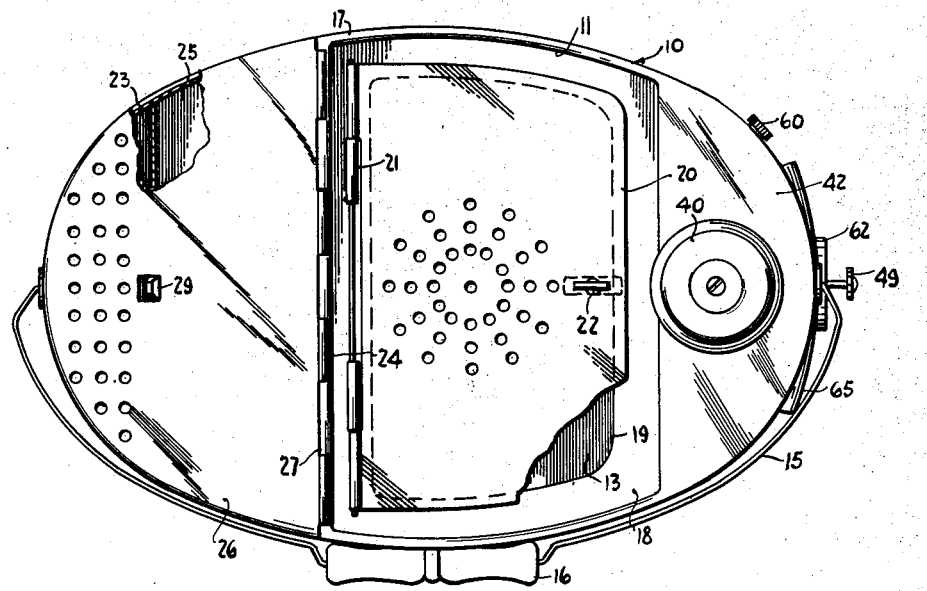
Fig. 1 is a plan view of my improved minnow bucket, with parts thereof broken away to better disclose the construction.

In carrying out my invention in the form herein disclosed I provide a bucket designated generally at 10 having an upright container wall 11 of elliptical shape in plan view, and a bottom 12. Spaced above the bottom 12 and secured with a water-tight joint to the wall 11 is a false bottom 13 forming therebeneath a chamber 14 in which a liquid fuel may be kept. The bucket is fitted in conventional manner with a bail 15 having a handle 16 at its center for carrying.

Secured within and somewhat below the upper rolled margin 17 of the bucket wall 11 is a top plate 18 having near its center a large opening 19 normally closed by a cover 20. The cover 20 is hinged at 21 to said top plate 18 and has a conventional latch 22 which will hold it closed but allow the cover to be opened to provide access to the interior of the bucket. At one end the top plate 18 is turned upwardly at 23 in spaced relation to an upright transverse strip 24 forming therebetween a tray 25 in which hooks and similar small tackle items may be stored. The tray 25 is closed by a cover 26 hinged at 27 atop the strip 24 and adapted to close not only the tray but the adjacent open end portion 28 of the bucket. A spring latch 29 is provided to hold the cover 26 closed and the cover has a transverse depending flange 30 (Fig. 2) adapted to slip over the upper edge of the upturned end 23 to prevent any possible escape of small items from the tray when the cover thereof is closed.

The heater assembly is located in the end of the bucket 10, opposite to that adjacent which the tray 25 is provided, and to form a burner chamber 31 for the heater, isolated from the interior of the bucket itself, I provide an upright transversely extending cross wall 32 the upper end of which is turned horizontally outward or endwise forming a shelf or support 33. The various edges of this angularly shaped cross member are all soldered or otherwise secured with water-tight joints to the false bottom 13 and upright wall 11 of the bucket as indicated at 34.

At its center the shelf 33 has a large opening 35 in which is soldered tightly the lower end of a tubular flue member 36, the upwardly tapering upper end portion of which extends through an opening 37 in the top plate 18. A conventional chimney piece or member 38 is provided having smoke openings 39 below its weather cap 40 and this chimney is supported over the upper end of the flue 36 and secured in an opening 41 formed in a plate 42 the edges of which are soldered to and shaped to fit the curved end of the bucket. The plate 42 is level with the rolled upper edge 17 of the bucket and is spaced, therefore, above the top plate 18 to which it is connected by a downwardly turned flange 43 soldered at 44 (Fig. 2) to said plate 18. There thus is formed between the plates 18 and 42 and across the full width of the bucket at this end an air supply chamber 45 the purpose of which will presently appear.

Figure 2:
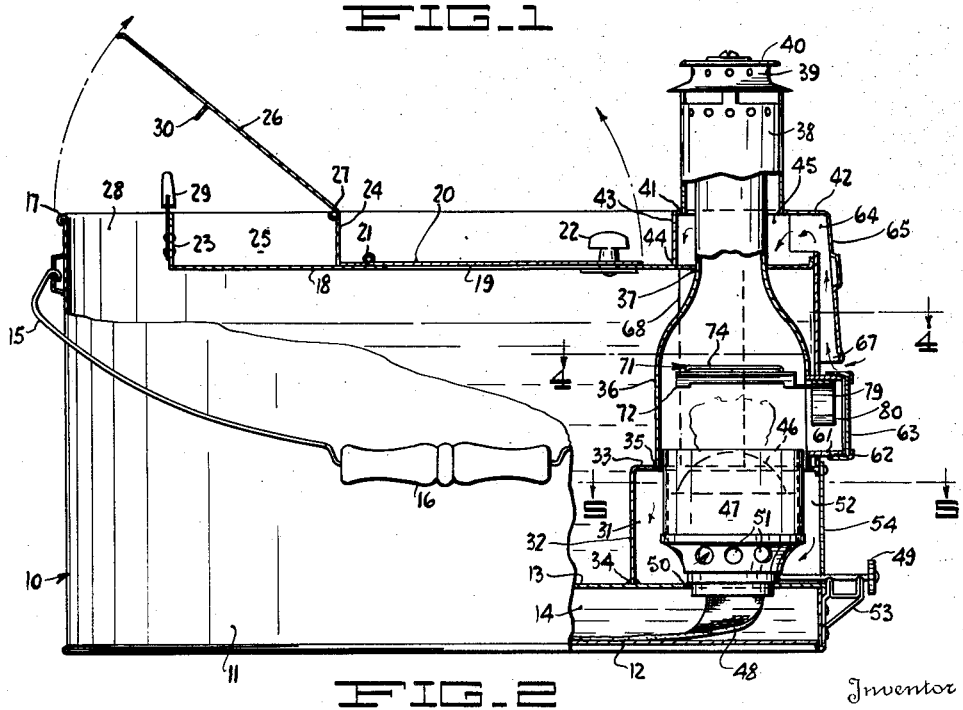
Fig. 2 is a side view, partially in vertical, longitudinal section.

The actual heater unit is a lamp burner designated at 46 which is supported within a cylindrical shell or housing 47 and provided with the usual wick 48 and adjustment shaft and knob 49 for moving the wick up or down. The housing 47 is seated at its lower end in an opening 50 in the false bottom 13 of the bucket so that the wick 48 may hang down into the fuel chamber 14 as seen in Fig. 2, and above the false bottom the housing has the usual air holes 51 through which air may enter the burner for combustion purposes. The wick adjustment 49 extends outward through a large opening 52 formed in the end of the bucket and is supported in a bracket 53 secured to the bucket therebeneath. The opening 52 is closed by an inspection plate or panel 54 secured thereto by screws 55 and this plate may be removed at any time to inspect the burner or for its removal, the latter being accomplished by lifting the housing 47 upward into the flue 36 until its lower end clears the opening 50 and then tilting and pulling the unit out through the opening 52.

The fuel chamber 14 may be filled through a capped neck 56 on the false bottom 13 access to which is had through an opening 57 in the side wall of the bucket. Said opening is fitted with a door 58 hinged to the bucket at 59 and provided with a latch 60 as clearly shown.

The burner 46 is lighted or extinguished by means of an inspection port member 61 of tubular form soldered in the flue member 36 above the burner and projecting outwardly through the adjacent end of the bucket. The outer extremity of said tubular port member is threaded to receive a screw cap 62 having a center of glass 63 or similar transparent material. The cap 62 may be removed to allow access to the burner and when replaced will allow the flame to be inspected and controlled at will. The glass 63 also allows the burner to serve as a lantern to aid the fisherman during the hours of darkness in baiting his hook or in any other activity in which illumination is necessary or helpful.

The plate 54 and cap 62 of course prevent the entrance of air to the burner and air for supporting combustion is taken from the aforesaid chamber 45 which it enters through air opening 64 (Fig. 2) formed in the end wall of the bucket inwardly of a depending hood 65. The hood 65 extends downwardly in spaced relation to the end of the bucket, is closed at its ends 66 (Fig. 4) and is open only at its lower edge at 67. Air from the chamber 45 then flows downward through draft tubes 68 arranged one at each side of the flue member 36. The upper ends of the draft tubes 68 are inserted in openings 69 (Fig. 3) in the top plate 18 and lower ends are soldered in openings 70 in the shelf 33.

The air thus may flow upwardly inside the hood 65, into the chamber 45, down through the tubes 68 and thence into the burner chamber or compartment 31 where it may enter the air holes 51 in the burner unit as required.

A flame spreader device 71 is supported above the burner unit 46 and as best seen in Figs. 2 and 6 this device comprises a plate 72 bent medially to a shallow V-shape and having a central, longitudinal slot 73 above which a baffle strip 74 is supported by its legs 75 which are riveted at 76 to the plate. A narrow end 77 of the plate 72 is riveted at 78 to the center of a bowed spring 79 which may be collapsed slightly and inserted into the tubular port member 61 wherein it will then expand and by friction support the spreader over the flame. The ends of the spring 79 are curled into eyes 80 so that, by inserting the ends of long nosed pliers into the eyes, the spring may be collapsed or sprung together for inserting or removing the spreader. Flame spreader 71 diverts the heat to the walls of flue member 36 which have the greatest amount of contact with the water in the outside water compartment. By doing so it tends to lessen the amount of heat which would normally be absorbed through port 61 and outer side or end of the bucket.

The operation of my invention will be apparent from the foregoing but it will be briefly described as follows. The bucket has its main chamber or compartment filled with water and the minnows placed therein, and then the burner 46 located in the separate chamber or compartment formed by the wall 32, shelf 33 and flue 36, is lighted by first removing and then replacing the cap 62. The flame from the burner is spread and caused to throw its heat against the walls of the flue member 36 and since the water in the bucket surrounds the flue it will be warmed and kept from freezing even in severe weather. Air for supporting combustion enters as described through the hood 65 and, following the tortuous path previously described, is prevented from reaching the burner with any turbulence such as to cause extinguishment of the flame. This is true no matter how strong the wind may be. The air flowing downward through the draft tubes 68 is further warmed, due to the action of the warmed water about the tubes, and thus facilitates proper burning of the fuel. The gases and smoke from the flame pass out, of course, through the chimney 38.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A minnow bucket having a chamber isolated from the interior of the bucket and about the outside of which chamber water contained in the bucket may circulate, a heating device for heating the interior of said chamber, and a false bottom in the bucket forming therebeneath a chamber for fuel for said heating device.

2. In a minnow bucket, a flue member arranged in the bucket but isolated therefrom so that water in the bucket may circulate about the exterior of said flue member, a burner in the flue member for heating the walls thereof, a tubular member communicating with the interior of the flue member above the burner and extending outward therefrom through the side of the bucket, a flame spreading device supported in said tubular member and disposed over the burner, said flame spreading device being removable through the tubular member, and a removable cap on the outer end of said tubular member.

3. In a minnow bucket, means forming a burner chamber in the lower part of the bucket, a flue leading upwardly from said chamber, a burner positioned in the chamber for heating the walls of the flue, means forming an air chamber in the upper part of the bucket surrounding the flue, and tubular means connecting the air chamber to the burner chamber for conducting air to the burner.

4. In a minnow bucket, means forming a burner chamber in the lower part of the bucket, a flue leading upwardly from said chamber, a burner positioned in the chamber for heating the walls of the flue, means forming an air chamber in the upper part of the bucket about the flue, tubular means connecting the air chamber to the burner chamber for conducting air to the burner, and means for admitting air to the air chamber including a hood member located on the outside of the bucket and opening downwardly at its lower end whereby air must enter and pass upwardly in passage into said air chamber.

5. A minnow bucket having a main compartment for water, another compartment separate therefrom, a heating device in said other compartment, and a third compartment for fuel for said heating device.

6. In a minnow bucket, a main compartment for water, means for heating the water, and a false bottom in the bucket forming a chamber to hold fuel for the heating means.

7. A minnow bucket having a main chamber for water, a separate chamber including an upright tubular flue member exposed to the water in the main chamber, a burner arranged within said flue member to direct its flame upwardly thereinto, and a longitudinally slotted plate positioned within the flue member in such a manner as to deflect the flame against the inner walls of the flue member.

OTTO W. LEAF.

REFERENCES CITED

The following references are of record in the file of this patent:

UNITED STATES PATENTS

| Number | Name | Date |
|---|---|---|
| 406,727 | Hacker et al. | July 9, 1889 |
| 489,874 | Orton | Jan. 10, 1893 |
| 591,183 | Williams | Oct. 5, 1897 |
| 633,554 | Magee | Sept. 19, 1899 |
| 662,738 | Rascher | Nov. 27, 1900 |
| 810,852 | Fifield | Jan. 23, 1906 |
| 843,925 | Bernard | Feb. 12, 1907 |
| 859,617 | Rimmelin | July 9, 1907 |
| 1,113,185 | Bernhard | Oct. 13, 1914 |
| 1,322,024 | Kaiser | Nov. 18, 1919 |
| 1,329,063 | Thomasson | Jan. 27, 1920 |
| 1,803,571 | Ulman | May 5, 1931 |
| 1,824,823 | Kump | Sept. 29, 1931 |
| 1,939,583 | Welhausen | Dec. 12, 1933 |
| 2,247,239 | Keating | June 24, 1941 |
| 2,445,302 | Clarkson | July 13, 1948 |